United States Patent
Gifford, Sr.

(10) Patent No.: US 6,663,060 B1
(45) Date of Patent: Dec. 16, 2003

(54) MICROPHONE STAND

(76) Inventor: Robert Wayne Gifford, Sr., 1411 Kittanning Pike, Karns City, PA (US) 16041

( * ) Notice: Subject to any disclaimer, the term of this patent is extended or adjusted under 35 U.S.C. 154(b) by 0 days.

(21) Appl. No.: 10/255,750

(22) Filed: Sep. 26, 2002

(51) Int. Cl.$^7$ ................................................ F16M 11/00
(52) U.S. Cl. .................... 248/161; 248/125.8; 248/157; 248/188.5
(58) Field of Search .................... 248/161, 157, 248/404, 407, 408, 411, 188.5, 125.8

(56) References Cited

U.S. PATENT DOCUMENTS 3,856,253 A * 12/1974 Seebinger .................... 248/411
4,113,221 A * 9/1978 Wehner ........................ 248/408
6,523,799 B2 * 2/2003 Su ................................ 248/404

* cited by examiner

Primary Examiner—Ramon O. Ramirez
(74) Attorney, Agent, or Firm—Aileen Champion Addessi

(57) ABSTRACT

A microphone stand or stand for supporting an object includes a first and a second support telescopically secured together. The second support is attached to a base and the first support is securable to a microphone or other object. A release mechanism for securing together or permitting telescopic movement of the first and second supports includes a spring positioned between two pins. The pins are positioned at an angular disposition with respect to the first and second supports for retaining the first support in a desired position. Compression of the pins toward one another allows slidable movement of the first support within the second support for adjusting the position of the object. A release of the pins allows the spring to push the pins back apart and into the angular position for holding the object at the desired height.

17 Claims, 2 Drawing Sheets

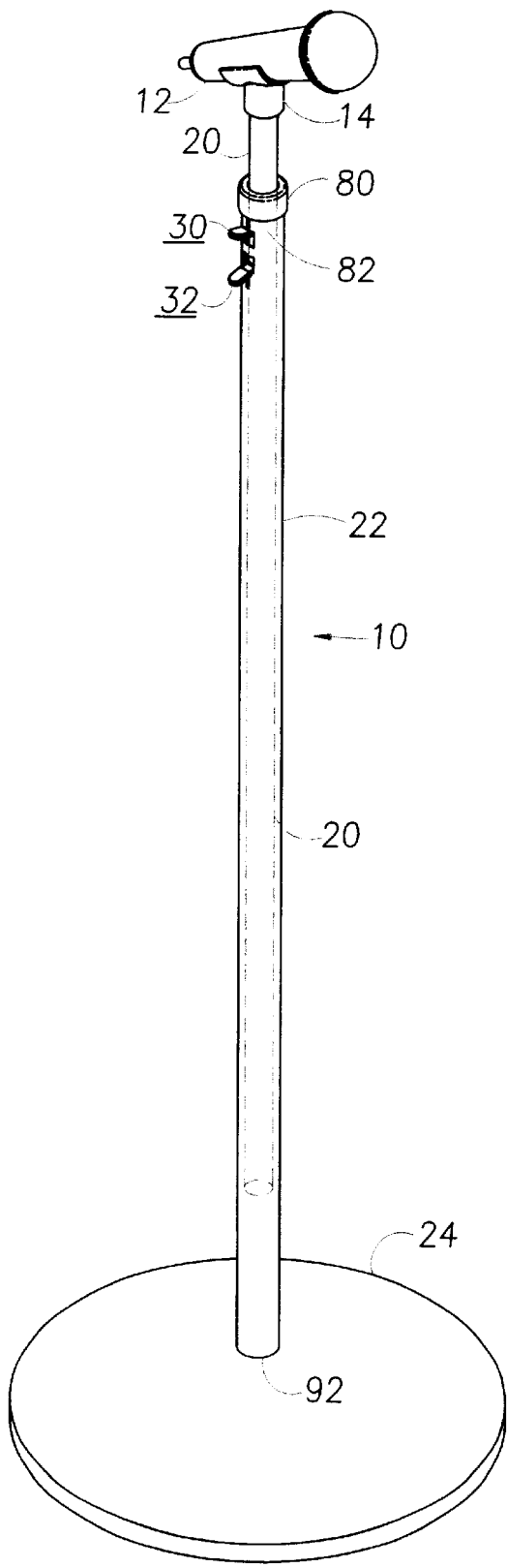
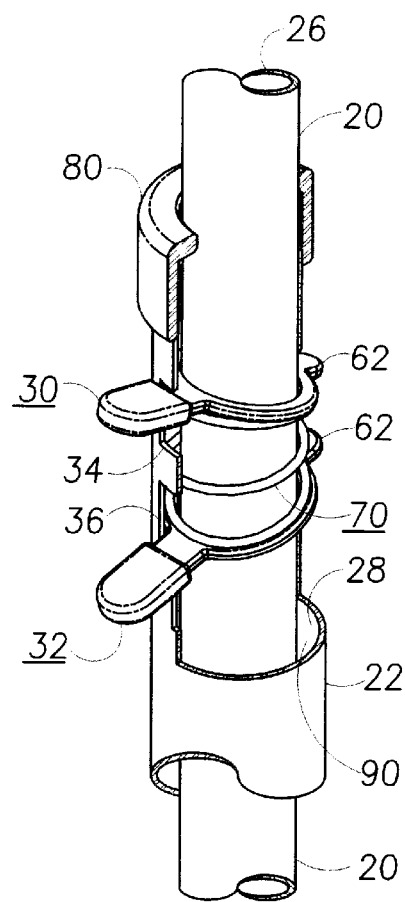
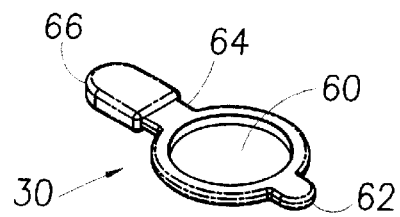
FIG. 1
FIG. 2
FIG. 3

MICROPHONE STAND

BACKGROUND OF THE INVENTION

The invention relates to structures on or in which something may be placed for support and, more particularly, to a microphone stand which may be raised or lowered depending on the height of the person using the stand.

Microphone stands are commonly used by musicians who are singing, playing musical instruments or both, by people speaking in front of a crowd, in various types of ceremonies, by children who are playing, etc. Often the microphone stand must be adjusted up or down to support the microphone at various heights for different people using the same microphone stand. For example, several musicians may play in an evening at the same night club. Each musician may need to adjust the microphone to suit his or her needs. A clumsy adjustment of the stand utilizes time that could be spent playing or singing, detracts from the performance, and may be embarrassing to the person trying to make the adjustment of the stand.

Currently, telescoping microphone stands are used which may be extended or retracted depending on the desired height of the stand. However, these stands have a mechanism which must be loosened prior to being able to slide the telescoping components of the stand. Often this creates a problem if the person is unable to loosen the mechanism. For example, the previous person may have over tightened the mechanism, and the next person may not be strong enough to loosen the mechanism.

Once the stand is repositioned, the mechanism must be retightened, while holding the telescoping pieces in the desired position. This requires additional time and if the mechanism is not tightened enough, the telescoping pieces may slide and not retain the desired position.

Therefore, what is needed is an apparatus for holding an object which may be easily and quickly raised and lowered for supporting the object at various heights.

SUMMARY OF THE INVENTION

A microphone stand or stand for supporting an object includes a first support attachable to the microphone or other object and a second support having a first end and a second end. The first end is telescopically attached to the first support and has a bore at least partially therethrough. The second support has at least one hole and at least one slot positioned intersecting the bore of the second support.

A base is attached to the second end of the second support. The stand further includes at least one pin positionable within the second support and having a protuberance engagable with the hole and a grip extension extendable through the slot for enabling a person to grasp the pin for manipulation of the pin. Each of the pins has an aperture sized for insertion of the first support.

A spring is disposed within the bore of the second support and positioned adjacent to and contacts each of the pins. The first support is slidable through the spring and through each of the pins during telescopic movement of the first support in the second support. Each of the pins are selectively movable within the slot of the second support for providing the telescopic movement of the first support for adjusting positioning of the microphone or other object.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 1 is a perspective view of a stand for supporting an object, such as a microphone;

FIG. 2 is a view illustrating internal components of the stand;

FIG. 3 is a view of a pin;

DESCRIPTION OF THE PREFERRED EMBODIMENT

Figure 4:
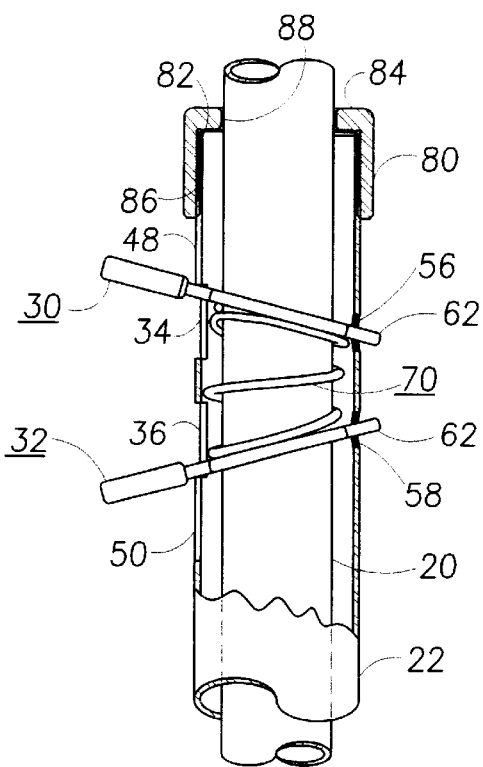
FIG. 4 is a partial cross-sectional view of the internal components in an uncompressed position of the pins.
Figure 5:
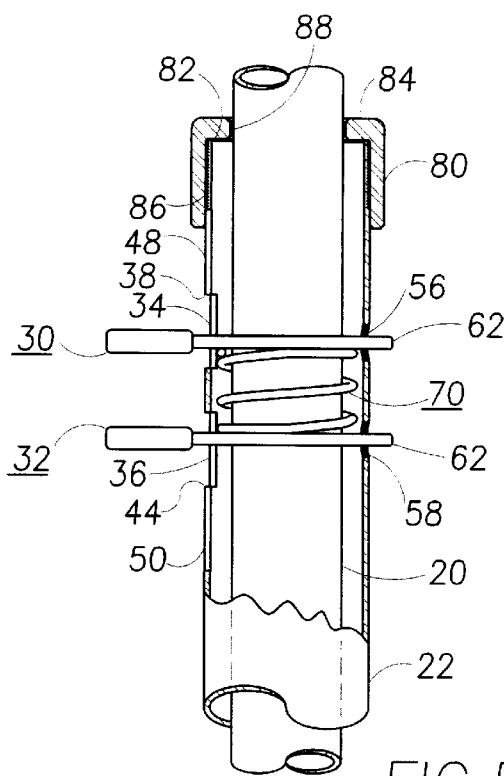
FIG. 5 is a partial cross-sectional view of the internal components in a compressed position of the pins.
Figure 6:
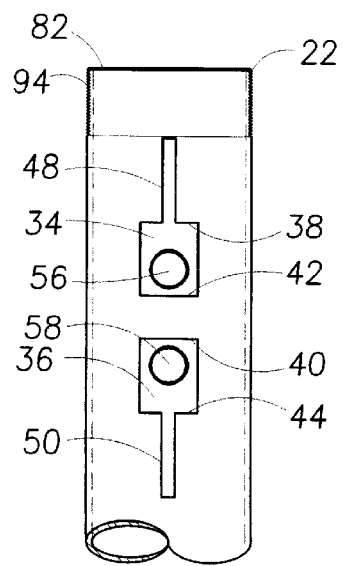
FIG. 6 is an elevational view of a pair of slots, slits and holes in a second support of the stand.

The invention described herein provides an apparatus for supporting an object at various heights. Referring to FIGS. 1–6, a stand 10 may be used for supporting an object 12, such as a microphone, a music stand, a drum, a lectern, or any other object. The stand 10 is adjustable for altering the position of the object 12 with respect to the height of the person using the stand 10.

The stand 10 includes a first support 20 and a second support 22 which are telescopically attached together. The object 12 or microphone is secured to the first support 20, for example by a bracket 14. The second support 22 is secured to a base 24, which rests on a ground surface. The first and second supports 20 and 22 may be elongated cylindrical shafts, may be hollow, solid, or combinations thereof, may be any geometric shape, but still mateable with one another, or may be any other suitable type of support members. The first and second supports 20 and 22 each have a bore 26 and 28, respectively.

The stand 10 further includes a release mechanism for holding the first and second supports 20 and 22 is a desired position and upon activation for allowing the first and second supports 20 and 22 to telescopically move with respect to one another. The release mechanism includes a first pin 30 and a second pin 32 which are insertable into and coupled to the second support 22. The first and second pins 30 and 32 are positionable within a first slot 34 and a second slot 36, respectively. Each of the first and second slots 34 and 36 have an upper surface 38 and 40, respectively, and a lower surface 42 and 44, respectively. The first pin 30 has a resting position near the upper surface 38 and is movable toward the lower surface 42. The second pin 32 has a resting position near the lower surface 44 and is movable toward the upper surface 40.

A first slit 48 extends upwardly from the upper surface 38 of the first slot 34 and a second slit 50 extends downwardly from the lower surface 42 of the second slot 36. The slits 48 and 50 are sized for allowing the pins 30 and 32 to fit within the slits 48 and 50 for insertion of the pins 30 and 32 into the second support 22.

A first hole 56 and a second hole 58 are disposed through the second support 22. The first hole 56 is positioned lower in elevation than the upper surface 38 of the slot 34 and higher in elevation than the lower surface 42 of the slot 34. The second hole 58 is positioned lower in elevation than the upper surface 40 of the slot 36 and higher in elevation than the lower surface 44 of the slot 36. The positioning of the first and second holes 56 and 58 holds the pins 30 and 32 at an angle while the pins 30 and 32 are disposed within the second support 22.

Each of the pins 30 and 32 has an aperture 60 therethrough which is sized for insertion of the first support 20 therethrough. Each of the pins 30 and 32 has a protuberance 62 which is sized for insertion into one of the first and second holes 56 or 58 in the second support 22. Each of the pins 30 and 32 has a grip extension 64 for extending through one of the first and second slots 34 or 36 for enabling a person to grasp the grip extension 64 to manipulate the pins 30 and 32. The grip extension 64 may additionally have a non-metallic material 66 attached on at least a portion of the pin 30 or 32 for providing a soft, flexible and comfortable grip.

A spring 70 is a helical spring which is positioned within the bore 28 of the second support 22 and between the first and second pins 30 and 32. The spring 70 includes a central portion sized for enabling the first support 20 to be disposed therethrough, thereby positioning the spring 70 between the first and the second supports 20 and 22.

A connector 80 is disposed over the first support 20 and positioned at an end 82 of the second support member 22 for closing a gap 90 between an outside diameter of the first support 20 and an inside diameter of the second support 22. As an example, the connector 80 may have a shoulder 84 for covering the gap, a threaded portion 86 mateably engagable with a threaded portion 94 of the second support 22, and a hole 88 therethrough for insertion of the first support 20. As an alternative to the threaded connection, the connector 80 may be merely positioned on the second support 22 or may be attached by other means.

For the various embodiments of this invention, the same reference characters will be used to designate like parts. In addition, like functions and like interactions of the parts among the various embodiments of this invention will not be repeated for each embodiment.

Figure 7:
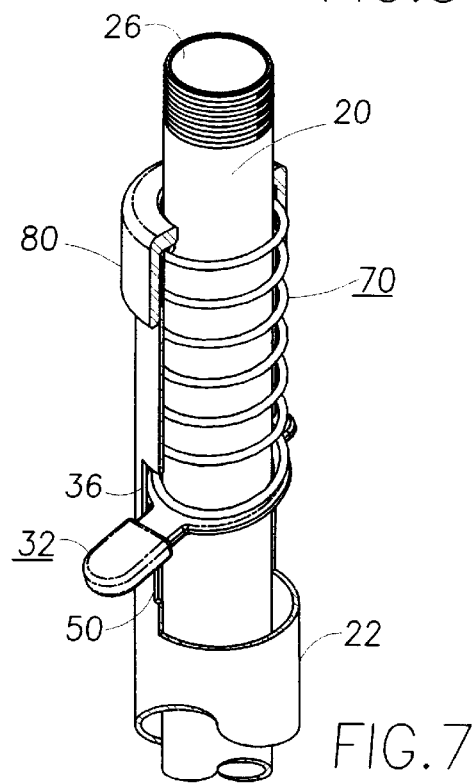
FIG. 7 is a view of an alternative embodiment of the stand for supporting an object.

Referring to FIG. 7 and using the same reference characters to define like parts, an alternative embodiment of the release mechanism for the stand 10 as illustrated in FIGS. 1–6 may be a release mechanism having like parts as the stand 10, but having only one pin 32, one slot 36, and one slit 50 which may extend either upwardly or downwardly. The spring 70 is positioned above the pin 32.

To assemble the components of the stand 10, the pin 32 is inserted through the slit 50 and rotated so that the aperture 60 is substantially aligned with the bore 28 of the second support 32. The protuberance 62 is inserted through the second hole 58 and the grip extension 64 extends through the slot 36. The spring 70 is disposed through the bore 28 of the second support 22 and rests on top of the second pin 32. The spring 70 is slightly compressed to insert the first pin 30 into the slit 48 and enable the pin 30 to be rotated so that the aperture 60 of the pin 30 substantially aligns with the bore 28 of the second support 32. The protuberance 62 of the first pin 30 is inserted through the first hole 56 and the grip extension 64 extends through the slot 34.

The spring 70 remains slightly compressed within the first and second supports 20 and 22 due to the positioning of the pins 30 and 32. Because the pine 30 and 32 are positioned at a slight angle, the spring 70 is compressed unevenly having a greater compression near the positioning of the first and second holes 56 and 58 as compared to the compression at the first and second slots 34 and 36. The spring 70 exerts pressure onto the pins 30 and 32 forcing the pins 30 and 32 outward or away from each other.

The pins 30 and 32 are compressed to insert the first support 20 into the second support 22 and through the pins 30 and 32. The connector 80 is slid over the first support 20 and threaded onto the first end 82 of the second support 22. A second end 92 of the second support 22 is secured to the base 24. The object 12 is attached to the first support 20.

In operation, use of the two pins 30 and 32 holds the first support 20 from sliding downwardly and upwardly within the second support 22. Due to the angular positioning of the pins 30 and 32, the pins 30 and 32 contact the first support 20 and prevent the first support 20 from moving with respect to the second support 22. To move the first support 20 in either direction, the pins 30 and 32 must be pressed toward one another to release the pressure exerted by the pins 30 and 32 onto the first support 20. When the pins 30 and 32 are pressed together and positioned substantially perpendicular to the second support 22, the aperture 60 aligns with the bore 28 and aligns with the first support 20, which allows the first support 20 to move with respect to the second support 22. After the pins 30 and 32 are released, the spring 70 forces the pins 30 and 32 back into the angular position and the first support 20 is again firmly held at the desired height.

Use of one pin 32 holds the first support 20 from sliding downwardly within the second support 22. To move the first support 20 in a downwardly direction, the pin 32 must be pushed to release the pressure exerted by the pin 32 onto the first support 20, which allows the first support 20 to move with respect to the second support 22. After the pin 32 is released, the first support 20 will not slide in the downwardly direction. However, the use of only one pin enables the first support 20 to be pulled in the upward direction whether the pin 32 is pressed or not.

An advantage of the stand for supporting an object is that the height of the object may be easily and quickly adjusted. A simple compression of the first and second pins 30 and 32 enables the first support 20 to be slid up or down depending on the desired height of the object. By simply releasing the first and second pins 30 and 32 holds the first support 20 in the desired location without any further action needed by the person making the adjustment.

Thus there has been shown and described a novel stand for supporting an object which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A microphone stand for supporting a microphone, comprising:

a first support attachable to the microphone;

a second support having a first end and a second end, the first end telescopically attached to the first support and having a bore at least partially therethrough, the second support having at least one hole and at least one slot positioned intersecting the bore;

a base attached to the second end of the second support;

pin means positionable within the second support and having a protuberance engagable with the at least one hole and a grip extension extendable through the at least one slot, pin means having an aperture sized for insertion of the first support therethrough;

a spring disposed within the bore of the second support and positioned adjacent to and contacting the pin means, the first support slidable through the spring and through the at least one pin during telescopic movement of the first support in the second support;

the pin means selectively movable within the slot of the second support for providing the telescopic movement of the first support for adjusting positioning of the microphone; and the pin means including a first pin and a second pin, the spring positioned between the first and second pins for restricting movement of the first support in an upward and a downward direction.

2. The microphone stand according to claim 1, wherein the pin means is positioned at an angle within the second support during a resting position of the pin means so that the pin means exerts force onto the first support for preventing the first support from moving within the second support.

3. The microphone stand according to claim 1, further comprising the second support having a slit extending from each of the at least one slots, the slit sized for enabling the pin means to be inserted through the slit and into the second support, the at least one pin rotatable within the at least one slot for positioning the pin means within the second support and having the aperture of the pin means substantially alignable with the bore of the second support.

4. The microphone stand according to claim 1, wherein the grip extension of pin means includes a non-metallic material for providing a soft and comfortable grip for a person to grasp.

5. The microphone stand according to claim 1, further comprising:

the first support disposed through the bore of the second support forming a gap between the first and second supports; and a connector coupled to the second support and having a hole for insertion of the first support and having a shoulder for covering the gap between the first and second supports.

6. The microphone stand according to claim 1, wherein the first and second supports are elongated cylinders.

7. A stand for supporting an object, comprising:

a first support attachable to the object;

a second support having a bore at least partially therethrough and telescopically mateable with the first support;

a base attached to the second support for stabilizing the second support;

at least one pin positioned within the bore of the second support and having an aperture therethrough, the first support slidable within the aperture of the pin during telescopic movement of the first and second supports, the at least one pin positioned at an angle within the first and second supports during a resting position of the at least one pin so that the at least one pin exerts force onto the first support for preventing the first support from moving within the second support; and a spring disposed within the bore of the second support and positioned adjacent to the at least one pin, manipulation of the at least one pin enables slidable movement of the first support through the spring and through the aperture of the at least one pin for adjusting positioning of the object.

8. The stand for supporting an object according to claim 7, further comprising:

the second support having at least one hole and at least one slot; and the at least one pin having a protuberance engagable with the at least one hole and a grip extension extending through the at least one slot for enabling a person to grasp the grip extension for manipulation of the pin to control movement of the first and second supports.

9. The stand for supporting an object according to claim 8, further comprising the second support having a slit extending from each of the at least one slots, the slit sized for enabling the at least one pin to be inserted through the slit and into the second support, the at least one pin rotatable within the at least one slot for positioning the at least one pin within the second support and having the aperture of the at least one pin substantially alignable with the bore of the second support.

10. The stand for supporting an object according to claim 7, wherein the at least one pin includes a first pin and a second pin, the spring positioned between the first and second pins for restricting movement of the first support in an upward and a downward direction.

11. The stand for supporting an object according to claim 7, wherein the at least one pin includes one pin and the spring is positioned above the pin for restricting movement of the first support in a downward direction.

12. The stand for supporting an object according to claim 7, further comprising:

the first support disposed through the bore of the second support forming a gap between the first and second supports; and a connector coupled to the second support and having a hole for insertion of the first support and having a shoulder for covering the gap between the first and second supports.

13. A stand for supporting an object, comprising:

a first support for supporting the object;

a second support mateably connectable with the first support, the first support slidable with respect to the second support for adjusting a position of the object, the second support having a bore extending longitudinally, a first hole, a first slot with a first slit extending therefrom, a second hole, and a second slot with a second slit extending therefrom;

a base attached to the second support for supporting the first and the second supports;

a first pin having a first protuberance, a first grip extension, and a first aperture therebetween, the first protuberance sized to extend through the first hole in the second support and the first grip extension extendable through the first slot in the second support for enabling a person to grasp the first grip extension of the first pin for manipulation of the first pin, the first support disposable through the first aperture of the first pin;

a second pin having a second protuberance, a second grip extension, and a second aperture therebetween, the second protuberance sized to extend through the second hole in the second support and the second grip extension extendable through the second slot in the second support for enabling a person to grasp the second grip extension of the second pin for manipulation of the second pin, the first support disposable through the second aperture of the second pin;

a spring positioned within the second support and between the first and second pins, the first support slidable within the spring having the spring positioned between the fit and second supports; and the first and second pins movable within the first and second slots respectively, movement of the first and second pins toward one another substantially aligns the first and second apertures with the bore of the second support for enabling the first support to slide within the first and second apertures and within the bore of second support for adjusting the position of the object, release of the first and second pins allows the spring to push the first and second pins back into an angular disposition for holding the first support in a desired position.

14. The stand for supporting an object according to claim 13, comprising:

the first slot having an upper surface and a lower surface;

the first hole positioned at a lower elevation as compared to a position of the upper surface of the first slot;

the second slot having an upper surface and a lower surface; and the second hole positioned at a lower elevation as compared to a position of the upper surface of the second slot for providing angular positioning of the first and second pins.

15. The stand for supporting an object according to claim 13, further comprising:

the first hole positioned at a higher elevation as compared to a position of the lower surface of the first slot; and the second hole positioned at a higher elevation as compared to a position of the lower surface of the second slot.

16. The stand for supporting an object according to claim 13, further comprising the first and second holes positioned diametrically opposite to the first and second slots.

17. The stand for supporting an object according to claim 13, further comprising:

the first support disposed through the bore of the second support forming a gap between the first and second supports; and a connector coupled to the second support and having a hole for insertion of the first support and having a shoulder for covering the gap between the first and second supports.

* * * * *